United States Patent
Nishimura et al.

(10) Patent No.: US 9,501,250 B2
(45) Date of Patent: Nov. 22, 2016

(54) APPARATUS, SYSTEM, AND METHOD OF CONTROLLING POWER SUPPLY, AND RECORDING MEDIUM STORING POWER SUPPLY CONTROL PROGRAM

(71) Applicants: Tatsuo Nishimura, Tokyo (JP); Tohru Sasaki, Kanagawa (JP); Tomohiro Kuroyanagi, Kanagawa (JP); Atsushi Okazato, Kanagawa (JP); Makoto Sasaki, Kanagawa (JP); Junki Aoki, Kanagawa (JP); Takuya Mori, Tokyo (JP); Hirohisa Saitoh, Tokyo (JP); Mie Watanabe, Tokyo (JP); Yukinori Ishii, Kanagawa (JP)

(72) Inventors: Tatsuo Nishimura, Tokyo (JP); Tohru Sasaki, Kanagawa (JP); Tomohiro Kuroyanagi, Kanagawa (JP); Atsushi Okazato, Kanagawa (JP); Makoto Sasaki, Kanagawa (JP); Junki Aoki, Kanagawa (JP); Takuya Mori, Tokyo (JP); Hirohisa Saitoh, Tokyo (JP); Mie Watanabe, Tokyo (JP); Yukinori Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/679,168

(22) Filed: Apr. 6, 2015

(65) Prior Publication Data
US 2015/0293728 A1    Oct. 15, 2015

(30) Foreign Application Priority Data

Apr. 14, 2014   (JP) ................................ 2014-083117

(51) Int. Cl.
*G06F 3/12* (2006.01)

(52) U.S. Cl.
CPC .......... *G06F 3/1229* (2013.01); *G06F 3/1285* (2013.01); *Y02B 60/1271* (2013.01)

(58) Field of Classification Search
None
See application file for complete search history.

(56) References Cited

U.S. PATENT DOCUMENTS

| 2003/0103236 | A1* | 6/2003 | Kato | ................ G06F 3/1204 358/1.15 |
| 2005/0099438 | A1* | 5/2005 | Lester | ................ B41J 13/0009 347/4 |
| 2008/0003033 | A1* | 1/2008 | Aizawa | ............. G03G 15/5004 400/62 |
| 2011/0058822 | A1* | 3/2011 | Shioyasu | ........... H04N 1/00347 399/8 |

FOREIGN PATENT DOCUMENTS

| JP | 2006-340223 | 12/2006 |
| JP | 2011-233106 | 11/2011 |

\* cited by examiner

*Primary Examiner* — Miya J Cato
(74) *Attorney, Agent, or Firm* — Cooper & Dunham LLP (57) ABSTRACT

An information processing apparatus stores function information that identifies, for each one of a plurality of functions, one or more devices capable of performing the function, receives a user instruction for executing a job from a first device of the plurality of devices, the user instruction instructing execution of at least one function that cannot be performed by the first device, identifies a second device of the plurality of devices that is capable of performing the at least one function of the user instruction using the function information, and controls the second device to transition from a power save mode to a normal operating mode, while keeping devices other than the second device to be in the power save mode.

14 Claims, 5 Drawing Sheets

APPARATUS, SYSTEM, AND METHOD OF CONTROLLING POWER SUPPLY, AND RECORDING MEDIUM STORING POWER SUPPLY CONTROL PROGRAM

CROSS-REFERENCE TO RELATED APPLICATIONS

This patent application is based on and claims priority pursuant to 35 U.S.C. §119 to Japanese Patent Application No. 2014-083117, filed on Apr. 14, 2014, in the Japan Patent Office, the entire disclosure of which is hereby incorporated by reference herein.

BACKGROUND

1. Technical Field

The present invention generally relates to an apparatus, system, and method each of which is capable of controlling power supply to a plurality of devices, and a non-transitory recording medium storing a power supply control program.

2. Description of the Related Art

The recent image processing systems include a plurality of multifunction peripherals such as copiers, facsimiles, printers, etc., and a plurality of personal computers, which are connected through a network. The plurality of apparatuses on the network may cooperate together to execute one job. For example, in response to an instruction for printing, one apparatus may generate image data of a document to be printed, and the other apparatus on the network may perform printing based on the image data.

On the other hand, in order to reduce power consumption, power supply to the plurality of apparatuses on the network may be centrally managed. For example, the plurality of apparatuses on the network may be switched to a power save mode if such apparatuses are not in use.

SUMMARY

Example embodiments of the present invention include an information processing apparatus connected to a plurality of devices through a network. The information processing apparatus stores, in a memory, function information that identifies, for each one of a plurality of functions, one or more devices capable of performing the function, receives a user instruction for executing a job from a first device of the plurality of devices, the user instruction instructing execution of at least one function that cannot be performed by the first device, identifies a second device of the plurality of devices that is capable of performing the at least one function of the user instruction using the function information, and controls the second device to transition from a power save mode to a normal operating mode, while keeping devices other than the second device to be in the power save mode.

Example embodiments of the present invention include an information processing system, which includes the information processing apparatus, a power supply control method performed by the information processing apparatus, and a control program stored in a recording medium to cause the information processing apparatus to perform the power supply control method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following, an information processing system is described as an embodiment of the present invention, which includes a plurality of information processing apparatuses connected through a network. The information processing apparatus in this embodiment may be a personal computer, or an image processing apparatus such as a copier, printer, facsimile, scanner, or a multifunction peripheral (MFP) capable of performing copying, printing, faxing, or scanning. However, any desired information processing apparatus may be used other than the PC or the image processing apparatus as long as at least two apparatuses connected via a network cooperate with each other to perform one job.

Further, in this embodiment, one main MFP that operates as a master apparatus controls power supply to a plurality of sub MFPs each of which operates as a slave apparatus. Alternatively, the master apparatus may be implemented by a personal computer, which is one example of the information processing apparatus. Alternatively, a network server apparatus may be provided on the network, which stores control data to be used by the master apparatus for controlling the salve apparatuses. The control data includes, for example, a power supply control program, various control data to be used for executing such program, and various information to be used for controlling power supply.

Figure 1:
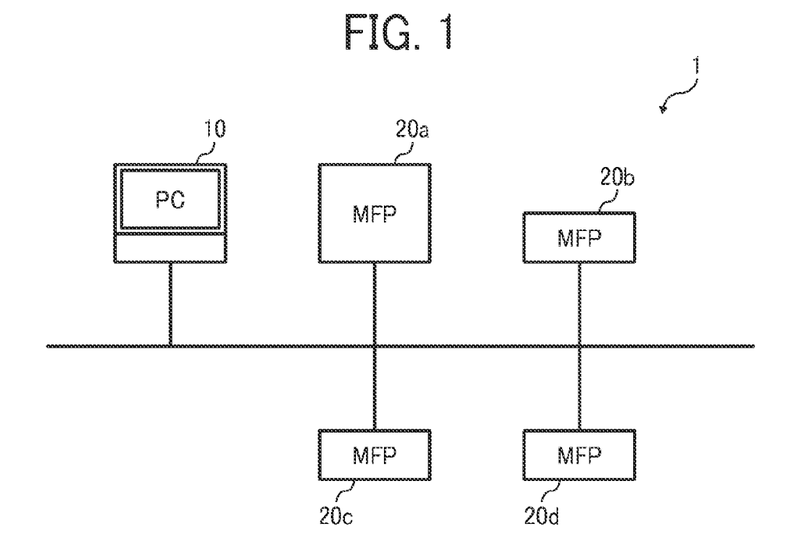
FIG. 1 is a schematic block diagram illustrating a configuration of an information processing system including a plurality of multifunction peripherals (MFPs) according to an example embodiment of the present invention.

Now, referring to FIG. 1, an image processing system 1, which is one example of the information processing system of the present invention, is described. The image processing system 1 includes a PC 10, a MFP 20a that operates as the master apparatus, and a plurality of MFPs 20b, 20c, and 20d each operating as the slave apparatus, which are connected through a network. The network may be any desired network such as a local area network (LAN) or a wide area network (WAN), which may be wired or wireless.

Figure 2:
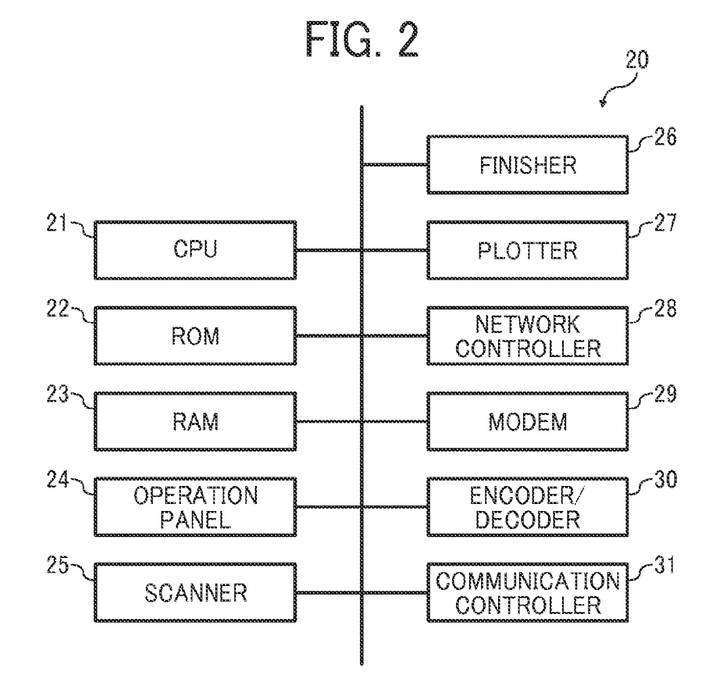
FIG. 2 is a schematic block diagram illustrating a hardware structure of the MFP of the information processing system of FIG. 1.

Referring now to FIG. 2, a hardware structure of the MFP 20 is described according to an example embodiment of the present invention. For the descriptive purposes, the MFP 20 of FIG. 2 is assumed to have the functions of printing, copying, faxing, and post processing.

The MFP 20 includes a central processing unit (CPU) 21, a read only memory (ROM) 22, a random access memory (RAM) 23, an operation panel 24, a scanner 25, a finisher 26, a plotter 27, a network controller 28, a modem 29, an encoder/decoder 30, and a communication controller 31.

The CPU 21 controls entire operation of the MFP 20. The ROM 22 stores various control programs to be executed by the CPU 21, and various data to be used by the CPU 21. The RAM 23 stores various data for execution by the CPU 21, and functions as a work area for the CPU 21. In this example, the power supply control program is stored in the ROM 22, which may be read by the CPU 21 onto the RAM 23 to cause the CPU 21 to perform operation of controlling power supply as described below.

The operation panel 24, which is one example operation port, receives user instructions such as a user input or displays various information for display to the user. In one example, the operation panel 24 includes a liquid crystal display (LCD) for displaying various information to the user, with a touch panel for allowing the user to input various instructions. Alternatively, a display such as the LCD may be provided separately from an input device such as keys or a touch panel.

The scanner 25 scans an original image into scanned image data. The plotter 27 forms an image on a recording sheet based on the scanned image data to output a printed sheet. Alternatively, the plotter 27 may form an image based on image data transmitted from the external apparatus such as the PC 10 through the network, or based on image data stored in any internal memory of the MFP 20. The finisher 26 is, for example, a post processor that punches the printed sheet output by the plotter 27 or staples the printed sheets output by the plotter 27.

The network controller 28 controls communication with the external apparatus through the network. The modem 29 modulates a signal to be transmitted to the external apparatus or signal received from the external apparatus. The encoder/decoder 30 encodes image data in a predetermined encoding format, or decodes encoded image data. The communication controller 31 allows facsimile communication with the external apparatus according to a predetermined communication protocol, such as G3 or G4 facsimile communication standard.

In the image processing system 1, the MFP 20a to 20d are assumed to be different in hardware structure, depending on one or more functions that can be performed by the MFPs 20a to 20d. For example, the MFP 20 capable of scanning has the scanner 25 with scan application stored in the ROM 22. The MFP 20 capable of performing post processing has the finisher 26 such as stapler or puncher, with post processing application stored in the ROM 22. The MFP 20 capable of communicating via facsimile has the modem 29 and the communication controller 31, with facsimile application stored in the ROM 22. The MFP 20 capable of performing data conversion has the encoder/decoder 30, which image processing application stored in the ROM 22. Further, a type of the device may differ depending on a specific function to be provided such that the finisher 26 may only include the puncher if the punching is only available, or the communication controller 31 may only be compatible with the G3 if the G3 standard is only available.

Figure 3:
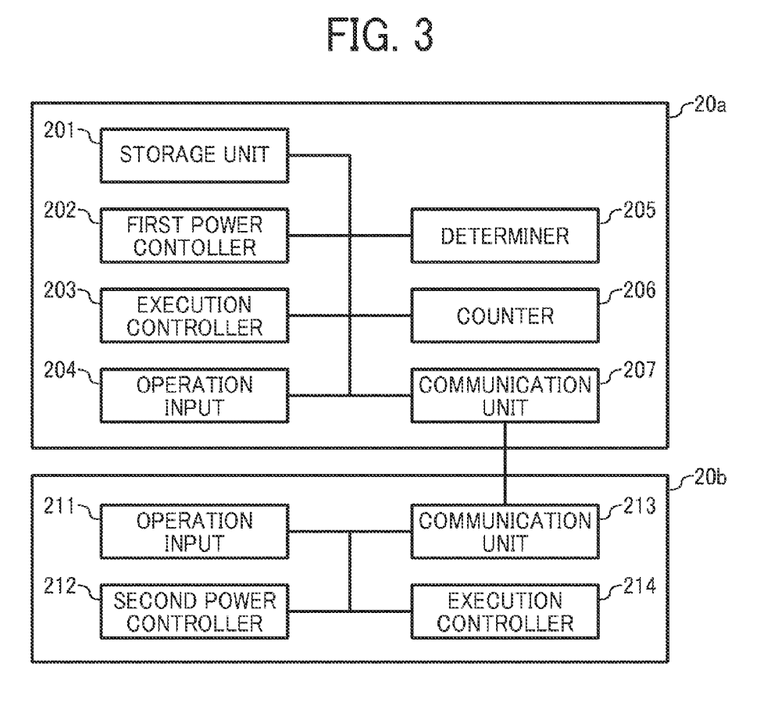
FIG. 3 is a schematic block diagram illustrating a functional structure of the MFP of FIG. 2 that operates as a master apparatus and the MFP of FIG. 2 that operates as a slave apparatus.

Referring to FIG. 3, a functional structure of the image processing system 1 of FIG. 1 is explained according to an example embodiment of the present invention. For simplicity, the MFP 20a operating as the master apparatus, and the MFP 20b operating as the slave apparatus are only explained referring to FIG. 3. Note that all other MFPs 20c and 20d are similar in function to the MFP 20b of FIG. 3.

The MFP 20a includes a storing unit 201, a first power controller 202, an execution controller 203, an operation input 204, a determiner 205, a counter 206, and a communication unit 207.

The storing unit 201, which may be implemented by any desired memory of the MFP 20a such as the ROM 22 or RAM 23, stores function information indicating one or more functions can be performed by at least one of the external MFPs 20b to 20d other than itself (MFP 20a) in the image processing system 1. The functions that can be performed by the external MFP 20 may be, for example, G3 facsimile communication, G4 facsimile communication, stapling, punching, data format conversion, and scanning.

Since the external MFP 20 for the MFP 20a is the salve MFP subject for power supply control by the master MFP 20a, in the following, the external MFP 20 for the MFP 20a may be referred to as the slave MFP 20. For example, the function information associates, for each function that can be performed by at least one slave MFP 20 in the system 1, device identification information for identifying each one of the slave MFPs 20 capable of performing that function.

The first power controller 202, which may be achieved by the instructions from the CPU 21 according to the power supply control program read into the RAM 23, controls power supply to the external MFP 20. For example, the first power controller 202 controls the external MFP 20 to transition from a normal operating mode to a power save mode in which power consumption is suppressed, or transition from the power save mode back to the normal operating mode.

In this example, it is assumed that the operating mode of the MFP 20 can be switched at least between the normal operating mode in which all devices in the MFP 20 is supplied with electric power, and the power save mode in which only a portion of the MFP 20 is supplied with electric power. The portion may include the operation panel 24 and the network controller 28, for example, such that at least a user instruction or an instruction from the external apparatus can be detected. Further, the power save mode may include any desired type of mode such as a sleep mode, as long as power consumption is less than that of the normal operating mode.

The execution controller 203, which may be achieved by the instructions from the CPU 21, instructs the external MFP 20 to perform one or more functions in response to a user instruction for executing a job. For example, the execution controller 203 may generate a request for transmission to the external MFP 20, which instructs to perform a specific operation (function) to execute a job as instructed by the user. Such request may be sent through the communication unit 207 to the external MFP 20, for example, with image data for processing.

Alternatively, when the MFP 20a is to execute one of the functions available for the MFP 20a, the execution controller 203 causes hardware of the MFP 20a to execute such function, for example, according to a control program.

The operation input 204, which may be achieved by operation panel 24, receives a user instruction for executing a job to perform an image processing operation using one or more functions of the image processing system 1.

The communication unit 207, which may be achieved by the network controller 28, receives various data from the external MFP 20. For example, in alternative to receiving the user instruction through the operation input 204, the communication unit 207 may receive the user instruction for executing the job from a user through any external MFP 20 or the PC 10. In one example, the MFP 20a operating as the master apparatus receives an instruction for executing a job that requires one or more functions to be performed on image data, from the MFP 20b through the communication unit 207. The image data may be transmitted from the MFP 20b to be at least temporarily stored in a memory of the MFP 20a. The MFP 20a may identify one or more slave MFPs 20 other than the MFP 20b to perform the functions on the image data, and further send the processed image data back to the MFP 20b.

The determiner 205, which may be achieved by the instructions from the CPU 21, identifies, for each function to be performed to complete the job as instructed, at least one external MFP 20 capable of performing that function, using the function information stored in the storage unit 201. For example, assuming that the user instruction for faxing document data is received from the user at the MFP 20b through the communication unit 207, the determiner 205 refers to the function information in the storage unit 201 to identify one or more slave MFPs 20 having the facsimile function.

The counter 206, which may be achieved by a counter function of the CPU 21, counts an operating time for the user to complete various inputs for the user instruction for executing the job. In the case of inputting a user instruction for facsimile transmission, the operating time is a time period that is counted from the time when the user selects the facsimile transmission (usually, the "fax" key displayed on the operation panel 24), to the time when the user presses an execution key (usually, the start key) after selecting or inputting various information such as a destination to which facsimile data is transmitted. For example, in response to selection of the facsimile transmission, the MFP 20b sends such selection to the MFP 20a to initiate counting by the counter 206 for the facsimile transmission instruction. In response to selection of the execution key, the MFP 20b further sends such selection to the MFP 20a to finish counting by the counter 206. In this manner, the counter 206 stores the counted operating time in the memory such as in the RAM 23 by a type of user instruction, every time the MFP 20a receives the user instruction from the external MFP 20. The determiner 205 may calculate an average value of the counted operating times for a specific user instruction that is stored in the memory, to obtain an estimated operating time of a specific user instruction. Using this estimated operating time, the determiner 205 determine whether to cause any slave MFP 20 to transition to a normal operating mode, for example, as described below referring to FIG. 8.

Still referring to FIG. 3, the MFP 20b includes an operation input 211, a second power controller 212, a communication unit 213, and an execution controller 214.

The operation input 211, which may be achieved by the operation panel 24, receives a user instruction for executing a job to perform an image processing operation using one or more functions of the image processing system 1.

The communication unit 213, which may be achieved by the network controller 28, receives various data from the other MFP 20 or sends various data to the other MFP 20. For example, when the MFP 20b receives the user instruction for executing the job from the user at the operation input 211, the MFP 20b sends the user instruction for executing the job to the master MFP 20a through the communication unit 213. Further, the MFP 20b may receive an instruction for performing a specific function to execute the job, from the master MFP 20a through the communication unit 213.

The second power controller 212, which may be achieved by the instructions from the CPU 21, controls power supply to itself (the MFP 20b). For example, the second power controller 212 controls the MFP 20b to transition from a normal operating mode to a power save mode in which power consumption is suppressed, or transition from the power save mode back to the normal operating mode. More specifically, the second power controller 212 switches at least between the power save mode and the normal operating mode, based on the instruction for switching the operating mode received from the master MFP 20a.

The execution controller 214, which may be achieved by the instructions from the CPU 21, executes a specific function based on the instruction for executing such function that is received from the master MFP 20a. More specifically, the execution controller 214 causes selected hardware illustrated in FIG. 2 to perform the specific function.

The MFP 20b, which operates as the salve apparatus, may additionally include any other functional module that is provided in the master MFP 20a. For example, the MFP 20b may additionally include the counter 206, which counts an operating time that requires for the user to input various information regarding the job to be executed. In such case, the MFP 20b may send the counted operating time to the MFP 20a through the communication unit 213 each time the MFP 20b receives the user instruction. The MFP 20a can then collect such information regarding the operating time for later use.

In example operation, the first power controller 202 of the master MFP 20a controls the slave MFP 20, which is identified by the determiner 205 as having the function as instructed by the user instruction, to transition from the power save mode to the normal operating mode. With this configuration, when all of the MFPs 20b to 20d are in the power save mode, only the MFP 20 that has a function to be executed is switched to the normal operating mode. As all other MFPs 20 except for the MFP 20 having the function to be executed are in the power save mode, energy consumption can be suppressed while at the same time increasing the processing speed for executing the job as it only requires less waiting time to execute the MFP 20 having the function to be executed.

In one example, when the determiner 205 identifies more than one MFP 20 capable of executing the function as instructed by the user instruction, the first power controller 202 of the MFP 20a may first cause all of the MFPs 20 having that function to transition from the power save mode to the normal operating mode. When one of the MFPs 20 to perform that function is selected, for example, by the user, the first power controller 202 causes all other MFPs 20 that are not selected to transition from the normal operating mode back to the power save mode.

In another example, when the determiner 205 identifies more than one MFP 20 capable of executing the function as instructed by the user instruction, the first power controller 202 of the MFP 20a may cause one of the MFPs 20 having the lowest power consumption rate to transition from the power save mode to the normal operating mode. In alternative to selecting one MFP 20 having the lowest power consumption rate, the first power controller 202 may cause a plurality of MFPs 20 having low power consumption rate, which is lower than a preset threshold. The MFP 20a may previously store information regarding the power consumption rate, or accumulated power consumption, of each slave MFP 20 in its memory. Alternatively, the MFP 20a may monitor each slave MFP 20 for power consumption to calculate the power consumption rate, or accumulated power consumption.

In another example, the determiner 205 of the MFP 20a may determine whether the estimated operating time that is obtained by the counter 206 for the user instruction to be executed, is less than an estimated execution time for two or more MFPs 20 that are identified as having the function to be executed. For example, the estimated execution time may be an average value of the execution times that require to execute the MFPs 20. When the execution time of the MFPs 20 is longer than the operating time of the user instruction, the first power controller 202 may cause the identified MFPs 20 to transition from the power save mode to the normal operating mode. With this configuration, the MFPs 20 that require longer execution time can be executed early, for example, before the user completes inputting the instruction.

When the execution time of the MFPs 20 is less than the operating time of the user instruction, the first power controller 202 may cause one or more of the MFPs 20 having lower (or lowest) power consumption rate, which are selected from among those MFPs 20, to transition from the power save mode to the normal operating mode.

In another example, when the determiner 205 identifies more than one MFP 20 capable of executing the function as instructed by the user instruction, the first power controller 202 of the MFP 20a may cause one or more of the MFPs 20 having a smaller number of functions to transition from the power save mode to the normal operating mode. It is based on assumption that the MFP 20 with many functions is most likely to be used by many users. By not selecting such MFP 20 with many functions when it is not needed, other users who need to use such MFP 20 with many functions may be able to use without waiting for a longer time.

In another example, when the determiner 205 identifies more than one MFP 20 capable of executing the function as instructed by the user instruction, the first power controller 202 of the MFP 20a may cause one of the MFPs 20 that is previously set to transition from the power save mode to the normal operating mode. For example, an administrator of the system 1 may set such MFP 20 for use to prevent any MFP that is under maintenance or trouble from being selected. In another example, a user of the system 1 may set such MFP 20 according to the user preference.

Figure 4:
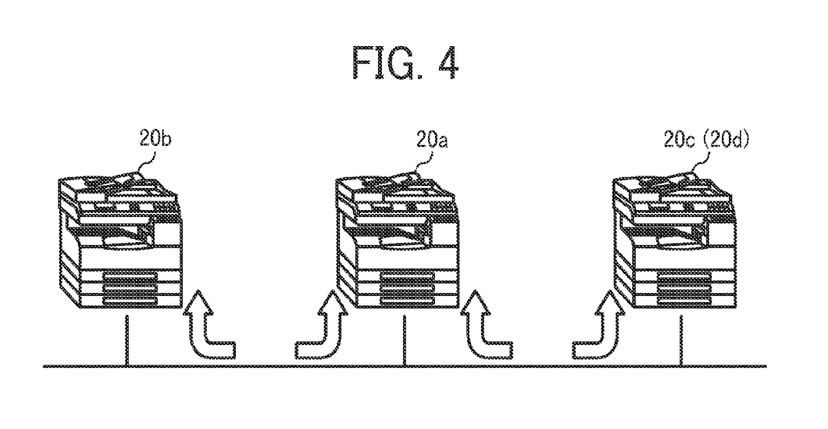
FIG. 4 is an illustration for explaining a flow of data among the MFPs of the information processing system of FIG. 1.
Figure 5:
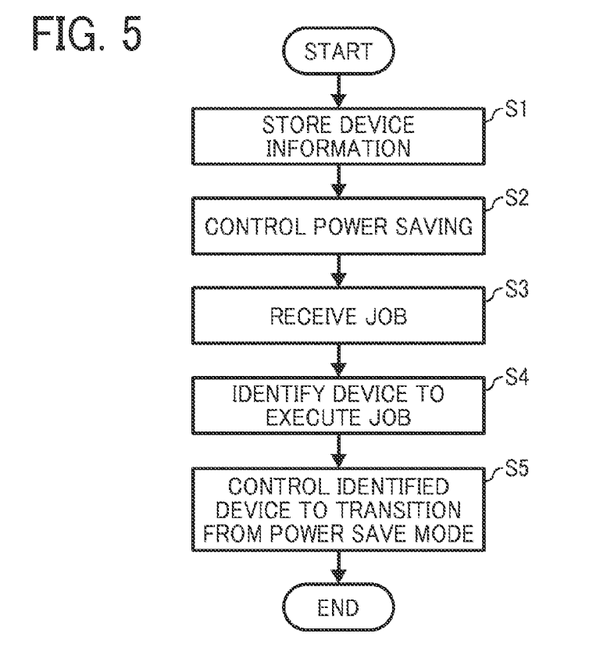
FIG. 5 is a flowchart illustrating operation of controlling power supply to the information processing system of FIG. 1, performed by the master MFP of FIG. 3, according to an example embodiment of the present invention.

Referring to FIGS. 4 and 5, example operation of controlling power supply to the image processing system 1, performed by the MFP 20a operating as the master apparatus, is explained. In this example, it is assumed that the MFP 20a (master) receives a user instruction for executing a job from the MFP 20b (first MFP), and instructs the MFP 20c or MFP 20d (second MFP) to perform one or more functions that are not available to the MFP 20b. Further, in this example, it is assumed that all of the MFPs 20b to 20d are provided with at least copying function (that is, printing function and scanning function) and network function, such that each MFP 20 is provided with the scanner 25, plotter 27, and network controller 28. The MFP 20c additionally has the stapling function, such that it is provided with the finisher 26. The MFP 20c further has the data format conversion function, such that it is provided with the encoder/decoder 29. The MFP 20d additionally has the facsimile function, such that it is provided with the communication controller 31 and the modem 29.

In this example, the MFP 20a stores in the RAM 23, a table 1 that associates, for each one of the functions available by the image processing system 1, function identification information for identifying the function and identification information for identifying each one of one or more MFPs 20 (devices) capable of providing that function.

TABLE 1

| Function | Device with Function |
| --- | --- |
| Stapling | C (10c) |
| File format conversion | C (10c) |
| G3 facsimile | D (10d) |
| G4 facsimile | D (10d) |

The table 1 indicates that the stapling function is provided by the MFP 20c with the ID "C", the file format conversion function is provided by the MFP 20c with the ID "C", the G3 facsimile communication function is provided by the MFP 20d with the ID "D", and the G4 facsimile transmission function is provided by the MFP 20d with the ID "D".

In one example operation, it is assumed that the user at the MFP 20b inputs a user instruction for executing printing and applying stapling through the operation panel 24 of the MFP 20b, when all of the MFPs 20a to 20d on the network operate in the power save mode. The MFP 20b sends the user instruction for printing and stapling to the master MFP 20a, with image data that is obtained by scanning. In response to the user instruction, the master MFP 20a refers to the table 1 stored in the memory to determine that the MFP 20c with the ID "C" has the stapling function. Based on determination, the master MFP 20a instructs the MFP 20c to transition from the power save mode to the normal operating mode. The MFP 20c, which is in the normal operating mode, form images on recording sheets based on the image data transmitted from the MFP 20b through the MFP 20a and staples a set of recording sheets to complete the job as instructed by the user instruction.

In another example operation, it is assumed that the user at the MFP 20b inputs a user instruction for executing scanning and storing in a specific data format, when all of the MFPs 20a to 20d on the network operate in the power save mode. The MFP 20b sends the user instruction for scanning and storing in a specific data format to the master MFP 20a. In response to the user instruction, the master MFP 20a refers to the table 1 stored in the memory to determine that the MFP 20c with the ID "C" has the data format conversion function. Based on determination, the master MFP 20a instructs the MFP 20c to transition from the power save mode to the normal operating mode. The MFP 20c, which is in the normal operating mode, receives the image data transmitted from the MFP 20b through the MFP 20a and converts a data format. The processed data may be transferred back to the MFP 20b through the MFP 20a for storage.

FIG. 5 is a flowchart illustrating operation of controlling power supply to the image processing system 1, performed by the master MFP 20a, according to an example embodiment of the present invention.

At S1, the master MFP 20a stores, in the memory, function information indicating, for each one of functions that can be provided by the image processing system 1, identification information for identifying each one of one or more slave MFPs 20b to 20d capable of providing that function, for example, as described above referring to the table 1. The function information may be stored by, for example, the administrator of the system 1. Alternatively, the MFP 20a may automatically obtain function information from each one of the slave MFPs 20b to 20d.

At S2, the first power controller 202 of the MFP 20a causes all slave MFPs 20b to 20d to transition to the power save mode. In this example, the power save mode is any mode in which power consumption is less than that of the normal operating mode. For example, in order to further reduce power consumption by the system 1, at least a part of the MFPs 20b to 20d each having high power consumption rate may be controlled to have a power save mode in which electric power consumption is kept at minimum.

In response to a user instruction received at the operation input 204 (operation panel 24) or the communication unit 207, the MFP 20a proceeds to perform S3. Note that S3 is performed in response to detection of a user instruction. At S3, the MFP 20a receives the user instruction for executing a job including various information input by the user and data to be processed. In this example, it is assumed that the user instruction for sending scanned data via facsimile is input through the MFP 20b. The MFP 20b sends the user instruction for executing the job, and scanned data to be processed, to the MFP 20a through the network.

At S4, the determiner 205 of the MFP 20a determines one or more functions to be executed, from control data that is included in the job that is the user instruction, and refers to the table storing the function information in the memory to identify one or more MFPs 20 having the function to be executed for each function. In this example, referring to the table 1, the determiner 205 selects the MFP 20d with the facsimile function.

At S5, the first power controller 202 of the MFP 20a causes the one or more MFPs 20 that are identified at S4, to transition from the power save mode to the normal operating mode. More specifically, in this example, the first power controller 202 causes the communication unit 207 to send an instruction for switching to the normal operating mode, to the identified MFP 20, such as the MFP 20d. In response to the instruction, the identified MFP 20d is switched to the normal operating mode such that electric power is supplied to the entire MFP 20d to be ready for receiving an instruction for executing the function.

After S5, the execution controller 203 sends an instruction for executing a specific function to the identified MFP 20d, with the image data to be processed. In response to the instruction, the MFP 20d converts the scanned data to facsimile data, and sends the facsimile data to a destination, thus executing the job according to the user instruction. The MFP 20a receives notification indicating completion of the job, from the MFP 20d, and may further send notification indicating completion of the job to the MFP 20b.

The operation of FIG. 5 may be performed in various ways, for example, as described below referring to FIGS. 6 to 10. Referring to FIGS. 6 to 10, examples of operation after identifying one or more MFPs 20 to execute the job and controlling power supply to the system 1 are explained.

Figure 6:
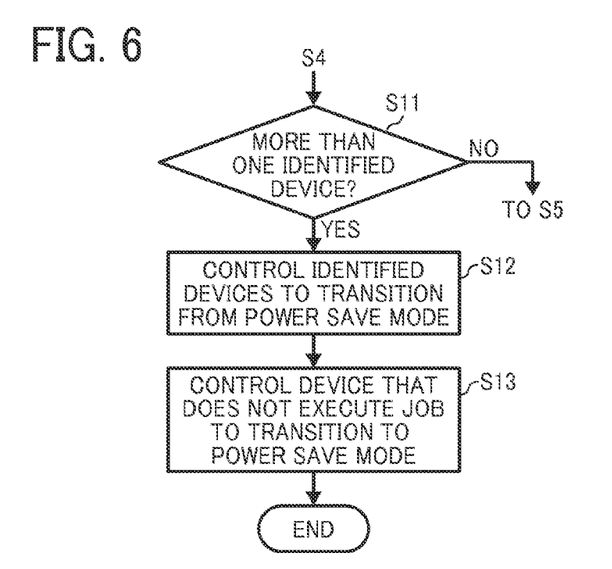
FIG. 6 is a flowchart illustrating operation of identifying the MFP for performing a function to execute a job and controlling power supply to the information processing system of FIG. 1, performed by the master MFP of FIG. 3, according to an example embodiment of the present invention.

FIG. 6 illustrates the case in which more than one MFP 20 is identified as the MFP provided with the instructed function, and power supply is controlled based on information regarding selection of MFP to execute the function.

Referring to FIG. 6, after identifying one or more MFPs 20 to perform the instructed function at S4, the operation proceeds to S11. At S11, the determiner 205 of the MFP 20a determines whether there is more than one MFP 20 capable of performing the function, for each function to be executed, by referring to the table storing the function information in the memory. When there is only one MFP 20 capable of performing the function ("NO" at S11), the operation proceeds to S5. At S5, the first power controller 202 of the MFP 20*a* causes the MFP 20 that is identified, to transition from the power save mode to the normal operating mode.

When there is more than one MFP 20 capable of performing the function ("YES" at S11), the operation proceeds to S12. At S12, the first power controller 202 of the MFP 20*a* causes two or more MFPs 20 that are identified, to transition from the power save mode to the normal operating mode. Meanwhile, the MFP 20*a* requests a user to select one of the MFPs 20 to execute the job, for example, by displaying a list of MFPs 20 that are capable of performing the function through the operation panel 24 of the MFP 20*b* that receives the user input. As the user inputs selection through the MFP 20*b*, the MFP 20*a* receives the user selection from the MFP 20*b*, and instructs the MFP 20 that is selected by the user to perform the function to be executed.

At S13, the first power controller 202 of the MFP 20*a* causes all other MFPs 20 that are not selected to perform the job, to transition from the normal operating mode to the power save mode. Since at least the MFPs 20 capable of performing the function to be executed are switched to the normal operating mode, the job can be executed with less waiting time for the user. At the same time, after making selection of one MFP 20 to perform the function, all other MFPs 20 are switched back to the power save mode, thus suppressing power consumption.

For example, it is assumed that the image processing system 1 includes the MFP 20*d* having the G3 facsimile communication capability, and an additional MFP 20*e* having the G4 facsimile communication capability. In such case, the determiner 205 selects the MFP 20*d* and the MFP 20*e*, as the MFP capable of performing the facsimile transmission. Based on selection, the first power controller 202 of the MFP 20*a* causes the MFPs 20*d* and 20*e* to transition from the power save mode to the normal operating mode. When the user at the MFP 20*b* selects a destination, which is compatible with the G4 standard, and presses the execution key, the MFP 20*a* selects the MFP 20*e* as the MFP 20 to perform the facsimile transmission and transmits an instruction for executing the job to the MFP 20*e*. At the same time, the MFP 20*a* instructs the MFP 20*d* to switch back to the power save mode.

Figure 7:
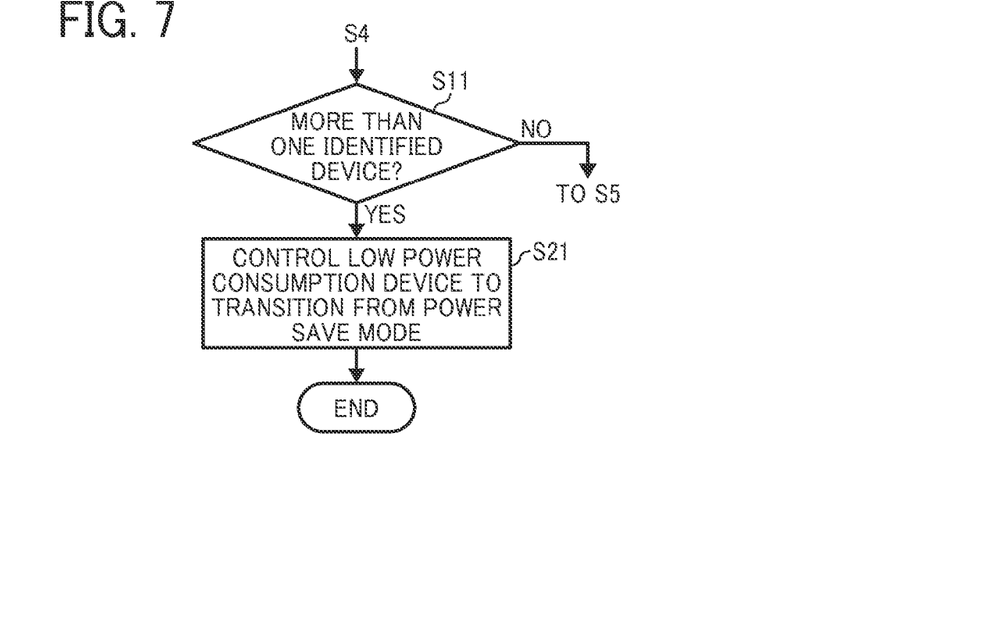
FIG. 7 is a flowchart illustrating operation of identifying the MFP for performing a function to execute a job and controlling power supply to the information processing system of FIG. 1, performed by the master MFP of FIG. 3, according to an example embodiment of the present invention.

FIG. 7 illustrates the case in which more than MFP 20 is identified as the MFP provided with the instructed function, and at least one MFP 20 having low power consumption rate is selected.

Referring to FIG. 7, after identifying one or more MFPs 20 to perform the instructed function at S4, the operation proceeds to S11. At S11, the determiner 205 of the MFP 20*a* determines whether there is more than one MFP 20 capable of performing the function, for each function to be executed, by referring to the table storing the function information in the memory. When there is only one MFP 20 capable of performing the function ("NO" at S11), the operation proceeds to S5. At S5, the first power controller 202 of the MFP 20*a* causes the MFP 20 that is identified, to transition from the power save mode to the normal operating mode.

When there is more than one MFP 20 capable of performing the function ("YES" at S11), the operation proceeds to S21. At S21, the first power controller 202 of the MFP 20*a* causes one of the MFPs 20 having the lowest power consumption rate, to transition from the power save mode to the normal operating mode. For example, the MFP 20*a* may be provided with information regarding the power consumption rate or the accumulated power consumption for each of the MFPs 20.

As the MFP 20 having the lowest power consumption rate is selected, power consumption by the system 1 is suppressed. Further, more than one MFP 20 may be selected as having the lowest, or low, power consumption rate.

Figure 8:
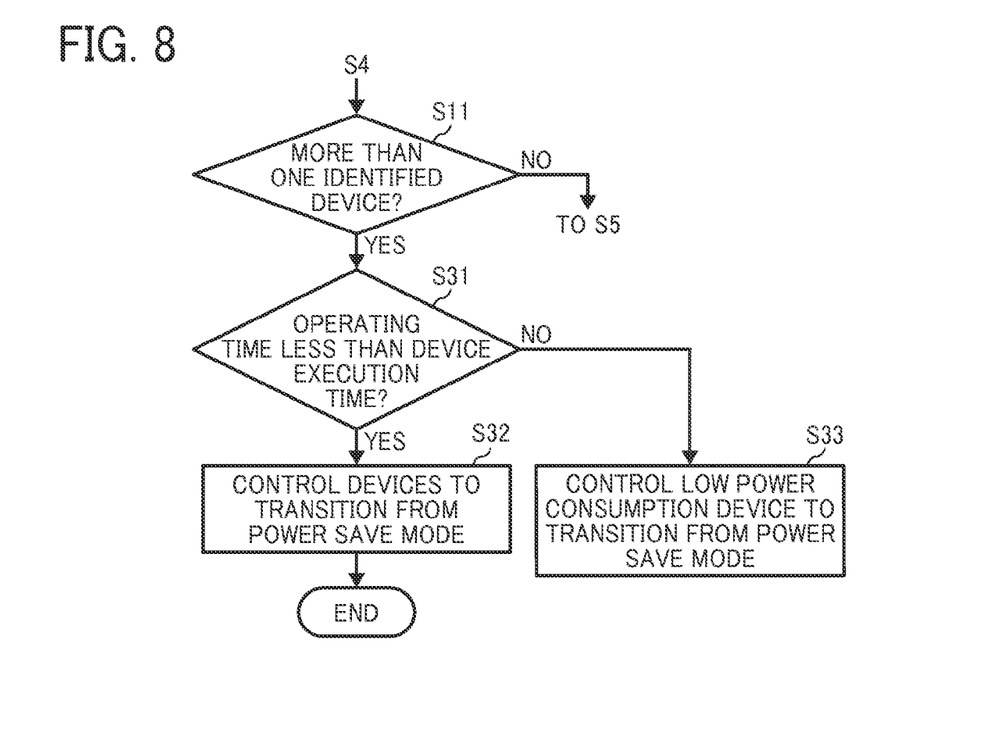
FIG. 8 is a flowchart illustrating operation of identifying the MFP for performing a function to execute a job and controlling power supply to the information processing system of FIG. 1, performed by the master MFP of FIG. 3, according to an example embodiment of the present invention.

FIG. 8 illustrates the case in which more than one MFP 20 is identified as the MFP provided with the instructed function, and power supply is controlled based on information on comparison between the estimated operating time of the user instruction and the estimated execution time of the MFP.

Referring to FIG. 8, after identifying one or more MFPs 20 to perform the instructed function at S4, the operation proceeds to S11. At S11, the determiner 205 of the MFP 20*a* determines whether there is more than one MFP 20 capable of performing the function, for each function to be executed, by referring to the table storing the function information in the memory. When there is only one MFP 20 capable of performing the function ("NO" at S11), the operation proceeds to S5. At S5, the first power controller 202 of the MFP 20*a* causes the MFP 20 that is identified, to transition from the power save mode to the normal operating mode.

When there is more than one MFP 20 capable of performing the function ("YES" at S11), the operation proceeds to S31. At S31, the first power controller 202 of the MFP 20*a* determines, for the MFPs 20 that are identified, whether the estimated operating time of the user instruction is less than an execution time for executing the MFP 20. For example, the execution time for executing the MFP 20 may be an average value of the execution times for executing the MFPs 20.

When it is determined that the operating time of the user instruction is less than the execution time of the MFP 20 ("YES" at S31), the operation proceeds to S32. At S32, the first power controller 202 of the MFP 20*a* causes all of the MFPs that are identified at S4 to transition from the power save mode to the normal operating mode. By executing the MFPs 20 before completing the user instruction, waiting time for the user can be suppressed.

When it is determined that the operating time of the user instruction is greater than the execution time of the MFP 20 ("NO" at S31), the operation proceeds to S33. At S33, the first power controller 202 of the MFP 20*a* causes at least one MFP having lowest power consumption rate to transition from the power save mode to the normal operating mode. Since the MFP 20 having lowest power consumption rate is switched to the normal operating mode, before completing the user instruction, waiting time for the user can be suppressed while suppressing power consumption.

Figure 9:
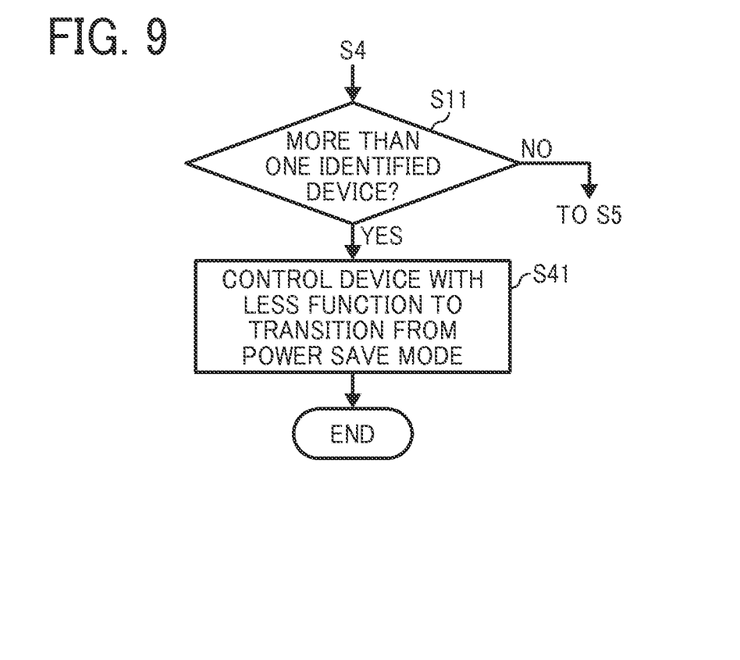
FIG. 9 is a flowchart illustrating operation of identifying the MFP for performing a function to execute a job and controlling power supply to the information processing system of FIG. 1, performed by the master MFP of FIG. 3, according to an example embodiment of the present invention.

FIG. 9 illustrates the case in which more than one MFP 20 is identified as the MFP provided with the instructed function, and power supply is controlled based on information regarding the functions of the MFP.

Referring to FIG. 9, after identifying one or more MFPs 20 to perform the instructed function at S4, the operation proceeds to S11. At S11, the determiner 205 of the MFP 20*a* determines whether there is more than one MFP 20 capable of performing the function, for each function to be executed, by referring to the table storing the function information in the memory. When there is only one MFP 20 capable of performing the function ("NO" at S11), the operation proceeds to S5. At S5, the first power controller 202 of the MFP 20*a* causes the MFP 20 that is identified, to transition from the power save mode to the normal operating mode.

When there is more than one MFP 20 capable of performing the function ("YES" at S11), the operation proceeds to S41. At S41, the first power controller 202 of the MFP 20*a* causes at least one MFP 20 having the least number of executable functions to transition from the power save mode to the normal operating mode.

For example, the storage unit 201 stores therein a table 2 as the function information indicating one or more functions that can be performed by each MFP 20, as illustrated below.

| Function | Device with Function |
| --- | --- |
| Stapling, File format conversion, G3 facsimile | E (20e) |
| File format conversion | F (20f) |

The table 2 indicates that the slave MFP 20e has the functions of stapling, file format conversion, and G3 facsimile communication, and the slave MFP 20f has the function of file format conversion. Assuming that the MFP 20a receives the user instruction for executing data format conversion from the MFP 20b, the MFP 20a selects the MFP 20f having only the file format conversion, from among the MFPs 20e and 20f that are identified as the MFP 20 having the file format conversion. This prevents the MFP with many functions from being selected, thus allowing the other user to use the MFP with many functions.

Figure 10:
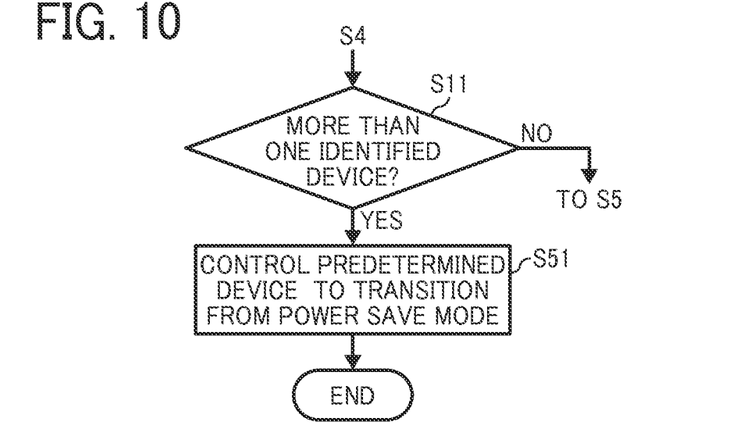
FIG. 10 is a flowchart illustrating operation of identifying the MFP for performing a function to execute a job and controlling power supply to the information processing system of FIG. 1, performed by the master MFP of FIG. 3, according to an example embodiment of the present invention.

FIG. 10 illustrates the case in which more than one MFP 20 is identified as the MFP provided with the instructed function, and power supply is controlled based on information regarding selection of MFP to execute the function.

Referring to FIG. 10, after identifying one or more MFPs 20 to perform the instructed function at S4, the operation proceeds to S11. At S11, the determiner 205 of the MFP 20a determines whether there is more than one MFP 20 capable of performing the function, for each function to be executed, by referring to the table storing the function information in the memory. When there is only one MFP 20 capable of performing the function ("NO" at S11), the operation proceeds to S5. At S5, the first power controller 202 of the MFP 20a causes the MFP 20 that is identified, to transition from the power save mode to the normal operating mode.

When there is more than one MFP 20 capable of performing the function ("YES" at S11), the operation proceeds to S51. At S51, the first power controller 202 of the MFP 20a causes one MFP 20, which is selected by the user, to transition from the power save mode to the normal operating mode. For example, the MFP 20a may cause any desired user interface, such as the operation panel 24 of the MFP 20b, to display a screen that requests the user to select one MFP 20 for use. The selection made by the user may be stored in the memory of the MFP 20a.

Alternatively, the MFP 20a may allow the user to select either to allow the MFP 20a to automatically select the MFP 20 for executing the function, or to allow the user to select the MFP 20 for executing the function. Based on this user preference, the MFP 20a may determine to automatically select or allow the user to select one of the MFPs 20 to execute the instruction function.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An information processing apparatus connected to a plurality of devices through a network, the apparatus comprising:
   a memory that stores function information that identifies, for each one of a plurality of functions, one or more devices capable of performing the function;
   a network interface that receives a user instruction for executing a job from a first device of the plurality of devices, the user instruction instructing execution of at least one function that cannot be performed by the first device; and circuitry that identifies a second device of the plurality of devices that is capable of performing the at least one function of the user instruction using the function information, and controls the second device to transition from a power save mode to a normal operating mode, while keeping devices other than the second device to be in the power save mode, wherein, when the circuitry identifies two or more devices as a candidate of the second device, the circuitry further controls the two or more identified devices to transition from the power save mode to the normal operating mode, and in response to selection of one of the two or more identified devices as the second device to perform the at least one function, controls the unselected identified devices to transition from the normal operating mode to the power save mode.

2. The information processing apparatus of claim 1, wherein, when the circuitry identifies two or more devices as a candidate of the second device, the circuitry further selects one of the two or more identified devices having the lowest power consumption rate as the second device to perform the at least one function.

3. The information processing apparatus of claim 1, wherein the memory further stores information regarding an operating time by each type of job, the operating time indicating a time period that is estimated to be required for a user to input a user instruction for executing the job, and the circuitry further obtains the operating time for the job in response to receiving the user instruction for executing the job, determines whether an execution time for executing the two or more identified devices is greater than the obtained operating time, and controls the two or more identified devices to transition from the power save mode to the normal operating mode based on determination indicating that the execution time is greater than the obtained operating time.

4. The information processing apparatus of claim 3, wherein the circuitry further selects one of the two or more identified devices having the lowest power consumption rate as the second device to perform the at least one function, based on determination indicating that the execution time is less than the obtained operating time.

5. The information processing apparatus of claim 1, wherein, when the circuitry identifies two or more devices as a candidate of the second device, the circuitry further selects one of the two or more identified devices having the least number of functions as the second device to perform the at least one function.

6. The information processing apparatus of claim 1, wherein, when the circuitry identifies two or more devices as a candidate of the second device, the circuitry further selects one of the two or more identified devices that is previously set as the second device to perform the at least one function.

7. An information processing system, comprising:

an information processing apparatus connected to a plurality of devices through a network, the apparatus comprising:

a memory that stores function information that identifies, for each one of a plurality of functions, one or more devices capable of performing the function;

a network interface that receives a user instruction for executing a job from a first device of the plurality of devices, the user instruction instructing execution of at least one function that cannot be performed by the first device; and circuitry that identifies a second device of the plurality of devices that is capable of performing the at least one function of the user instruction using the function information, and controls the second device to transition from a power save mode to a normal operating mode, while keeping devices other than the second device to be in the power save mode;

the first device configured to send the user instruction for executing a job to the information processing apparatus through the network;

the second device configured to transition from the power save mode to the normal operating mode according to an instruction received from the information processing apparatus; and a memory that stores information regarding an operating time by each type of job, the operating time indicating a time period that is estimated to be required for a user to input a user instruction for executing the job, wherein, when the circuitry identifies two or more devices as a candidate of the second device, the circuitry of the information processing apparatus further obtains the operating time for the job in response to receiving the user instruction for executing the job, determines whether an execution time for executing the two or more identified devices is greater than the obtained operating time, and controls the two or more identified devices to transition from the power save mode to the normal operating mode based on determination indicating that the execution time is greater than the obtained operating time.

8. A method of controlling power supply to a plurality of devices, comprising:

storing, in a memory, function information that identifies, for each one of a plurality of functions, one or more devices capable of performing the function;

receiving a user instruction for executing a job from a first device of the plurality of devices through a network, the user instruction instructing execution of at least one function that cannot be performed by the first device;

identifying a second device of the plurality of devices that is capable of performing the at least one function of the user instruction using the function information, and controlling the second device to transition from a power save mode to a normal operating mode, while keeping devices other than the second device to be in the power save mode, wherein, when the identifying identifies two or more devices as a candidate of the second device, controlling the two or more identified devices to transition from the power save mode to the normal operating mode, and controlling the unselected identified devices to transition from the normal operating mode to the power save mode, in response to selection of one of the two or more identified devices as the second device to perform the at least one function.

9. The method of claim 8, wherein, when the identifying identifies two or more devices as a candidate of the second device, the method further comprising:

selecting one of the two or more identified devices having the lowest power consumption rate as the second device to perform the at least one function.

10. The method of claim 8, further comprising:

storing, in the memory, information regarding an operating time by each type of job, the operating time indicating a time period that is estimated to be required for a user to input a user instruction for executing the job, and obtaining the operating time for the job in response to receiving the user instruction for executing the job;

determining whether an execution time for executing the two or more identified devices is greater than the obtained operating time; and controlling the two or more identified devices to transition from the power save mode to the normal operating mode based on determination indicating that the execution time is greater than the obtained operating time.

11. The method of claim 10, further comprising:

selecting one of the two or more identified devices having the lowest power consumption rate as the second device to perform the at least one function, based on determination indicating that the execution time is less than the obtained operating time.

12. The method of claim 8, wherein, when the identifying identifies two or more devices as a candidate of the second device, the method further comprising:

selecting one of the two or more identified devices having the least number of functions as the second device to perform the at least one function.

13. The method of claim 8, wherein, when the identifying identifies two or more devices as a candidate of the second device, the method further comprising:

selecting one of the two or more identified devices that is previously set as the second device to perform the at least one function.

14. A non-transitory recording medium which, when executed by one or more processors, cause the processors to perform a method of controlling power supply to a plurality of devices, the method comprising:

storing function information that identifies, for each one of a plurality of functions, one or more devices capable of performing the function;

receiving a user instruction for executing a job from a first device of the plurality of devices through a network, the user instruction instructing execution of at least one function that cannot be performed by the first device;

identifying a second device of the plurality of devices that is capable of performing the at least one function of the user instruction using the function information, and controlling the second device to transition from a power save mode to a normal operating mode, while keeping devices other than the second device to be in the power save mode, wherein, when the identifying identifies two or more devices as a candidate of the second device, the method further comprising controlling the two or more identified devices to transition from the power save mode to the normal operating mode, and controlling the unselected identified devices to transition from the normal operating mode to the power save mode, in response to selection of one of the two or more identified devices as the second device to perform the at least one function.

* * * * *